(12) United States Patent
Uemura

(10) Patent No.: US 10,902,574 B2
(45) Date of Patent: Jan. 26, 2021

(54) INFORMATION PROCESSING APPARATUS, IMAGE CAPTURE SYSTEM, CONTROL METHOD AND STORAGE MEDIUM

(71) Applicant: CANON KABUSHIKI KAISHA, Tokyo (JP)

(72) Inventor: Hidetaka Uemura, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 98 days.

(21) Appl. No.: 16/161,425

(22) Filed: Oct. 16, 2018

(65) Prior Publication Data

US 2019/0122353 A1 Apr. 25, 2019

(30) Foreign Application Priority Data

Oct. 23, 2017 (JP) ................................ 2017-204586

(51) Int. Cl.
*G06K 9/00* (2006.01)
*G06T 7/00* (2017.01)
*H04N 5/232* (2006.01)
*H04N 5/235* (2006.01)
*H04N 21/218* (2011.01)

(52) U.S. Cl.
CPC ......... *G06T 7/0002* (2013.01); *H04N 5/2351* (2013.01); *H04N 5/23251* (2013.01); *H04N 21/21805* (2013.01); *G06T 2207/30168* (2013.01)

(58) Field of Classification Search
CPC ........................................... G06T 2207/30168
See application file for complete search history.

(56) References Cited

U.S. PATENT DOCUMENTS

| 7,610,361 | B2 | 10/2009 | Manthoulis et al. | |
|---|---|---|---|---|
| 2010/0060793 | A1* | 3/2010 | Oz | H04N 5/275 348/584 |
| 2015/0015672 | A1* | 1/2015 | Iwasaki | H04N 5/23229 348/46 |
| 2016/0246061 | A1* | 8/2016 | Bickerstaff | G06F 3/012 |
| 2016/0282619 | A1* | 9/2016 | Oto | G02B 27/017 |
| 2017/0235848 | A1* | 8/2017 | Van Dusen | G06F 16/904 705/12 |

* cited by examiner

*Primary Examiner* — Oneal R Mistry
(74) *Attorney, Agent, or Firm* — Cowan, Liebowitz & Latman, P.C.

(57) ABSTRACT

An information processing apparatus evaluates the image quality of a viewpoint image in an image capture system that generates a viewpoint image of an arbitrary viewpoint by compositing captured images captured at a plurality of different viewpoints. The apparatus obtains information on the state of installation of a plurality of image capturing apparatuses that output captured images to be used to generate one viewpoint image, and obtains evaluation values of the captured images based on the information on the state of installation. Then, the image quality of the viewpoint image is determined based on the obtained evaluation values of the captured images.

9 Claims, 3 Drawing Sheets

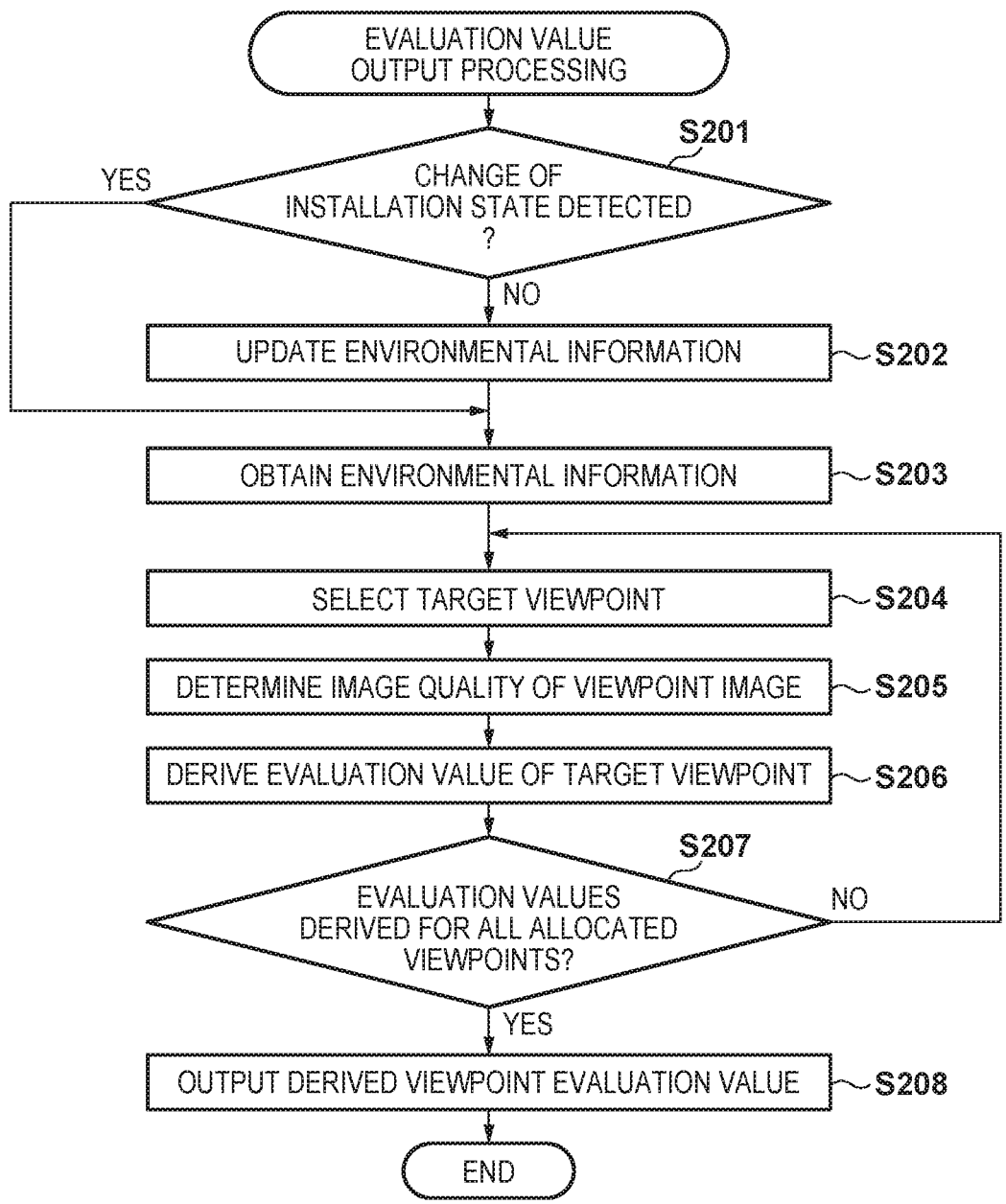

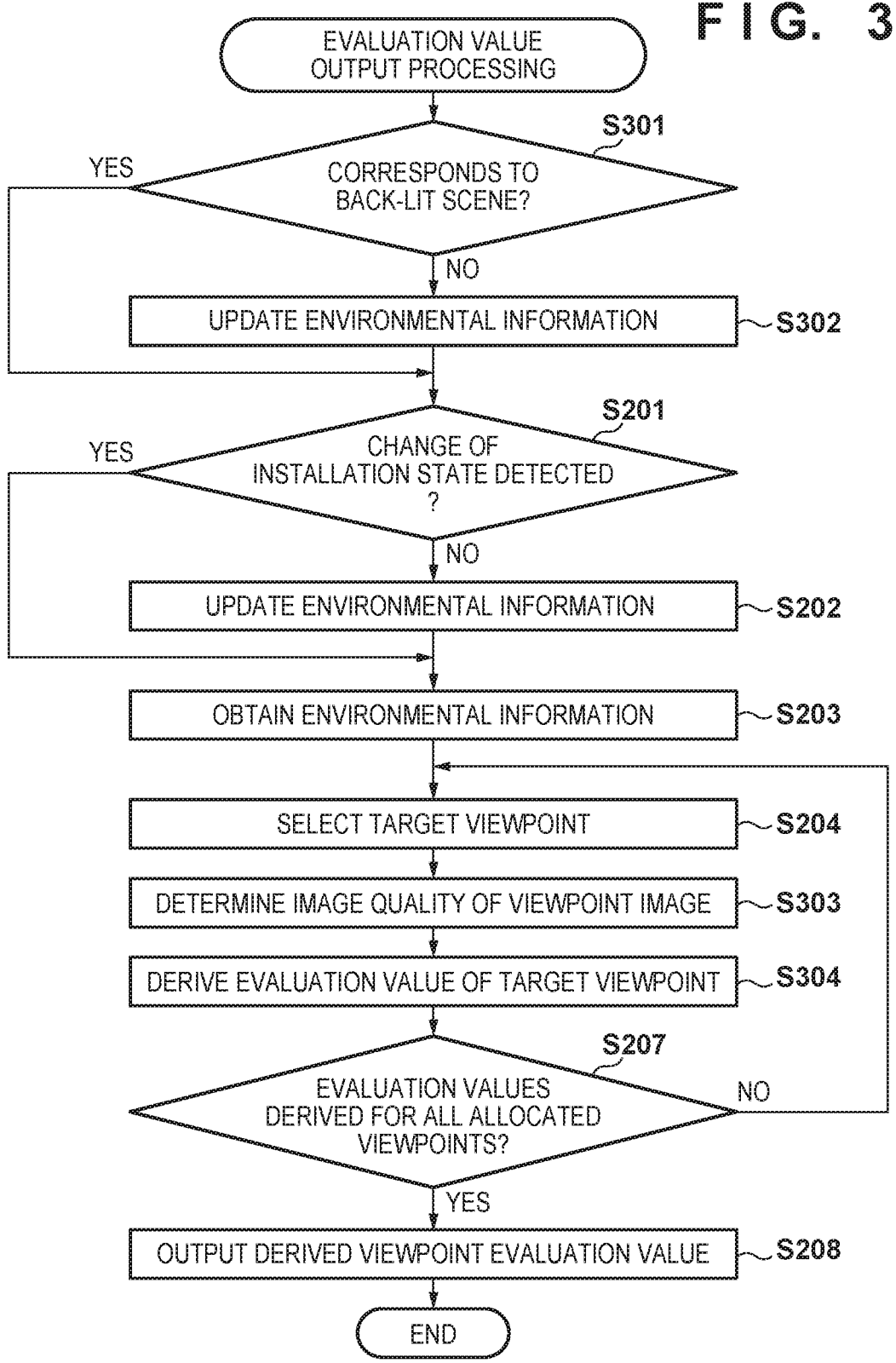

INFORMATION PROCESSING APPARATUS, IMAGE CAPTURE SYSTEM, CONTROL METHOD AND STORAGE MEDIUM

BACKGROUND OF THE INVENTION

Field of the Invention

The present invention relates to an information processing apparatus, an image capture system, a control method, and a storage medium, and particularly to a technique for generating an image of an arbitrary viewpoint based on images obtained from image capturing apparatuses that are arranged at a plurality of positions.

Description of the Related Art

In recent years, it has been possible to capture images of a predetermined subject using a plurality of image capturing apparatuses arranged at different positions, and use the obtained captured images to generate, through interpolation, a so-called arbitrary viewpoint image in which the subject is captured from a desired viewpoint position and direction. For example, U.S. Pat. No. 7,106,361 discloses a system that collects images captured by a plurality of image capturing apparatuses installed around a subject, and generates an image sequence that progresses while continuously switching to provide a viewing experience in which the subject is viewed while the viewpoint is moved.

However, with an arbitrary viewpoint, although a suitable viewing experience can be provided in an environment in which a plurality of image capturing apparatuses are ideally installed, this can be undermined by the status of the installation environment, such as the installation condition or the state of illumination of the image capturing apparatuses. That is, for example, if there are occurrences such as being unable to install an image capturing apparatus in a predetermined image capturing direction, the image quality of a captured image degrading due to vibration, shielding, or the like, or the tint of the captured images from some of the image capturing apparatuses changing due to changes in the illumination condition, it is possible that an image of a desired viewpoint may not be suitably generated. Therefore, if an image sequence like the one described in U.S. Pat. No. 7,106,361 is generated, occurrences such as not being able to generate an appropriate viewpoint image or variation occurring in the image quality between frames, can hinder the provision of a suitable viewing experience.

In particular, in a case where images are distributed while viewpoint switching is also performed approximately in real-time, as in so-called relay broadcasting, it is necessary to grasp such conditions of the installation environment before switching a viewpoint. However, until now, there has not been a system that displays an evaluation value that takes the installation environment into account as a guideline for viewpoint switching.

SUMMARY OF THE INVENTION

The present invention was made in view of such problems in the conventional technique. The present invention provides an information processing apparatus which outputs an evaluation value of an installation environment that is a guideline for viewpoint switching, an image capture system, a control method and a storage medium.

The present application in its first aspect provides an information processing apparatus for generating a viewpoint image of an arbitrary viewpoint by compositing captured images captured at a plurality of different viewpoints, comprising: at least one processor; and a memory including instructions that, when executed by the at least one processor, cause the at least one processor to: obtain information on a state of installation of a plurality of image capturing apparatuses that output captured images to be used for generation of a first viewpoint image of a first viewpoint; obtain evaluation values of the captured images output by the plurality of image capturing apparatuses; and determine image quality of the viewpoint image generated for the first viewpoint, based on the evaluation values of the captured images, wherein the evaluation values of the captured images are based on the information on the state of installation.

The present application in its second aspect provides an image capture system for generating viewpoint image of an arbitrary viewpoint by compositing captured images captured at a plurality of different viewpoints, comprising: a plurality of image capturing apparatuses configured to capture images at a plurality of different viewpoints; at least one processor; and a memory including instructions that, when executed by the at least one processor, cause the at least one processor to: obtain information on a state of installation of some of the image capturing apparatuses that output captured images to be used to generate a first viewpoint image of a first viewpoint; obtain evaluation values of the captured images output by sonic of the image capturing apparatuses; and determine image quality of the viewpoint image generated for the first viewpoint, based on the evaluation values of the captured images, wherein the evaluation values of the captured images are based on the information on the state of installation.

The present application in its third aspect provides a control method for an information processing apparatus for generating a viewpoint image of an arbitrary viewpoint by compositing captured images captured at a plurality of different viewpoints, comprising: obtaining information on a state of installation of a plurality of image capturing apparatuses that output captured images to be used to generate a first viewpoint image of a first viewpoint; obtaining evaluation values of the captured images output by the plurality of image capturing apparatuses; and determining image quality of the viewpoint image generated for the first viewpoint, based on the evaluation values of the captured image, wherein the evaluation values of the captured images are based on the information on the state of installation.

The present invention in its fourth aspect provides a computer-readable storage medium storing a program to be used by an information processing apparatus for generating a viewpoint image of an arbitrary viewpoint by compositing captured images captured at a plurality of different viewpoints, the program being configured to cause a computer of the information processing apparatus to execute: obtaining information on a state of installation of a plurality of image capturing apparatuses that output captured images to be used to generate a first viewpoint image of a first viewpoint, obtaining evaluation values of the captured images output by the plurality of image capturing apparatuses, and determining image quality of the viewpoint image generated for the first viewpoint based on the evaluation values of the captured images, wherein the evaluation values of the captured images are obtained based on the information on the state of installation.

Further features of the present invention will become apparent from the following description of exemplary embodiments (with reference to the attached drawings).

BRIEF DESCRIPTION OF THE DRAWINGS

FIG. 2 is a flowchart illustrating evaluation value output processing executed by a digital video camera 100 according to Embodiment 1 of the present invention.

FIG. 3 is a flowchart illustrating the evaluation value output process executed by the digital video camera 100, according to Embodiment 2 of the present invention.

DESCRIPTION OF THE EMBODIMENTS

Embodiment 1

Figure 1:
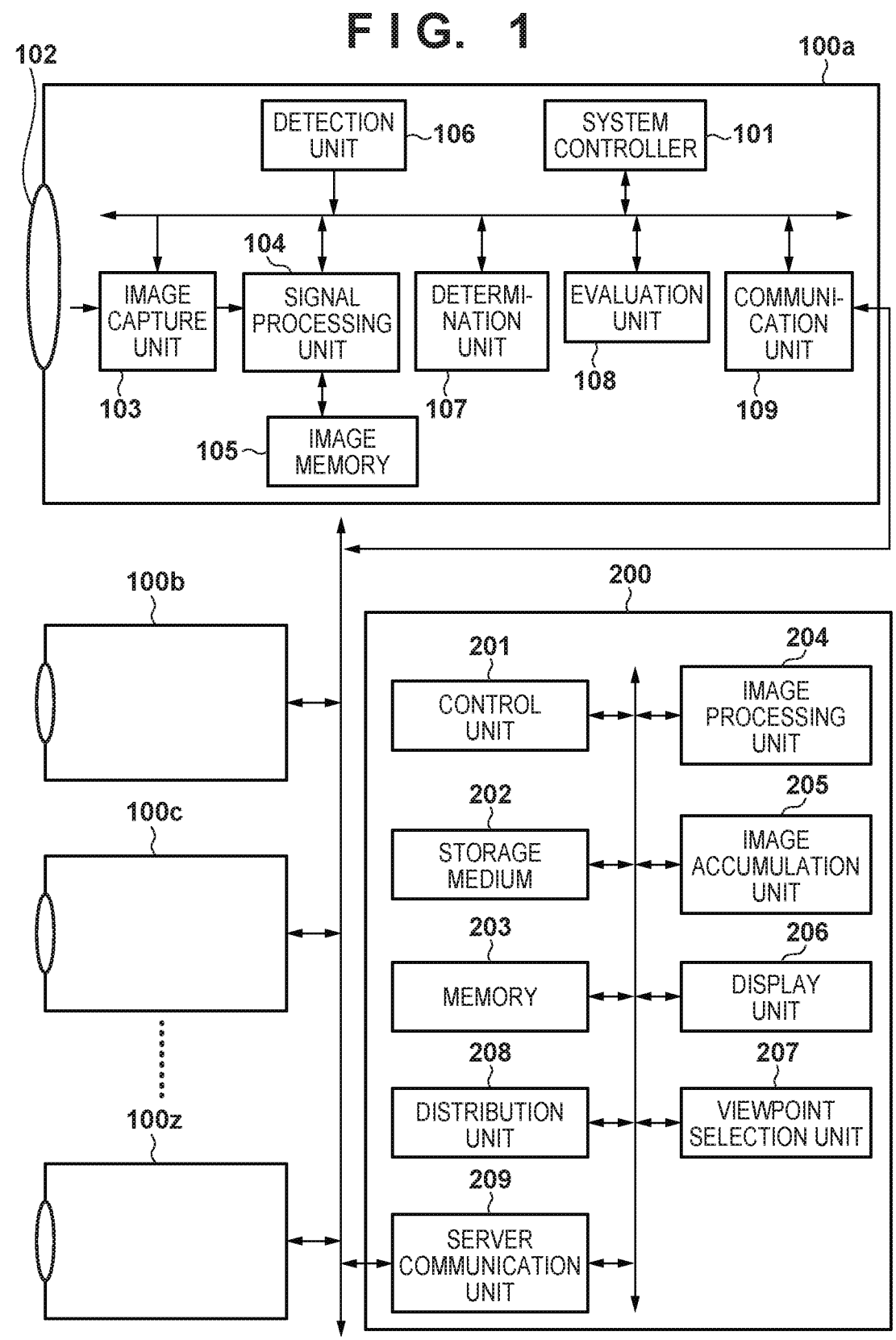
FIG. 1 is a block diagram showing a functional configuration of apparatuses of an image capture system, according to embodiments of the present invention and variations thereof.

Hereinafter, an embodiment of the present invention will be described with reference to the drawings. Note that the embodiment below describes an example in which the present invention is applied to a system serving as an example of an image capture system, which includes a control server configured to cause a plurality of digital video cameras corresponding to a plurality of image capturing apparatuses to work together and enable the provision of an image (moving image) of an arbitrary viewpoint. However, the present invention can be used in this kind of system, and can be applied to an arbitrary device that enables information communication between a plurality of image capturing apparatuses and in which the image capturing apparatuses can work together to capture images of a subject including at least a portion that is the same between the image capturing apparatuses. Alternatively, the present invention can be applied to an arbitrary device that is configured be able to obtain predetermined information for each of the plurality of image capturing apparatuses and evaluate the quality of the images of the arbitrary viewpoints at each viewpoint.

System Configuration

FIG. 1 is a block diagram showing apparatuses included in an image capture system according to the present embodiment of the present invention, and a functional configuration of the apparatuses. In the example shown in FIG. 1, 26 digital video cameras 100a to 100z are connected to a distribution server 200 as a group of digital video cameras 100 that work with one another, but the number of digital video cameras 100 that work with one another are not limited thereto in the embodiments of the present invention. Also, in the present embodiment, for the sake of simplicity, FIG. 1 shows a configuration of only one digital video camera 100 (digital video camera 100a), and the configurations of the digital video cameras 100 are the same. However, the configurations of the digital video cameras 100 do not need to be the same, and may be different in terms of specifications or performance, and may include other configurations. In the following description, if it is necessary to identify the digital video cameras 100, the digital video cameras 100 are identified with the attached characters a to z, and by attaching these characters in the same manner to the functional configurations as well, a configuration can be specified as belonging to one of the digital video cameras 100.

In the present embodiment, each of the digital video cameras 100 is installed at a different predetermined geographic position around the subject, and has an orientation set such that the main subject and its surrounding region are included in the image capturing range. In other words, the digital video cameras 100 correspond to different viewpoints that present the main subject, and an image is generated which presents the main subject from a predetermined viewpoint, based on the images (captured images) captured from these viewpoints in the distribution server 200 in the present embodiment. More specifically, a group of captured images output from the group of digital video cameras 100 capture the main subject from fixed points, and a corresponding viewpoint image is generated for a viewpoint that is different from these fixed points by compositing the captured images in the distribution server 200. In the present embodiment, the distribution server 200 stores the group of captured images output from the group of digital video cameras 100, and generates a viewpoint image using the captured images, which are used for compositing, for each of the predetermined viewpoints. In other words, in the generation of the viewpoint image of the predetermined viewpoint, the group of captured images of fixed points that are used for compositing are determined in advance, and the distribution server 200 need only generate the viewpoint image upon obtaining the predetermined group of captured images, for example.

As will be described later, the distribution server 200 distributes the viewpoint image of the selected viewpoint to an end user terminal that is connected via a network (not shown). In other words, each of the generated viewpoint images is stored in the distribution server 200, and the viewpoint that has been image of the viewpoint that has been selected to be distributed is read out and distributed. Here, the end user terminal need only be configured to be able to receive the viewpoint image distributed by the distribution server 200, and the medium for transferring the viewpoint image is not limited to a transfer path such as a network, and broadcast waves may be used thereas.

Note that in the present embodiment, a viewpoint image for each of the predetermined viewpoints is generated and stored in the distribution server 200, and a viewpoint image that has been selected for distribution is transmitted to the end user terminal. However, embodiments of the present invention are not limited to this and, for example, it is also possible to use a configuration in which a corresponding viewpoint image is generated and distributed in response to a viewpoint for distribution being selected.

Configuration of the Digital Video Camera 100

The following is a detailed description of the configuration of the digital video camera 100 in the present embodiment.

A system controller 101 controls the operation of the blocks of the digital video camera 100. The system controller 101 has an internal memory 1, and has a storage region for performing permanent data storage and a work region for performing temporary data deployment, intermediate data holding, and the like. The system controller 101 reads out the operation program for the blocks stored in the storage region, and can control the operation of the blocks by deploying the programs to the work region and executing them.

An image capture unit 103 is an image sensor, such as a CCD or CMOS for example, that photoelectrically converts an optical image formed on an image capture surface of the image sensor via an image capturing optical system 102, and outputs an analogue image signal of one frame of a moving image. The image capturing optical system 102 is a group of lenses that is constituted by including a shift lens that changes the image formation position at the optical center of the image capture surface, and the driving of the lenses is controlled by lens control (not shown) according to image capture settings that have been set. The image capture unit 103 outputs an analogue image signal, which was obtained through image capture, to a sequential signal processing unit 104 for each line of the image sensor.

A signal processing unit 104 applies each type of signal processing for image optimization, including A/D conversion processing and development processing, to the analogue image signal captured and output by the image capture unit 103, and outputs and stores the obtained digital image signal (captured image) in an image memory 105.

A detection unit 106 includes various sensors that detect blurring which occurs in the digital video camera 100. The various sensors may be gyrosensors, geomagnetic sensors, GPS receivers, or the like, and detect changes in the position (including height) and the orientation (direction of image capture) of the digital video camera 100. Phenomena detected by the detection unit 106 include "blurring" of the digital video camera 100 caused by wind, vibration, and the like, or changes in the installation position and direction of image capture of the digital video camera 100. Note that in the present embodiment, changes in the position and orientation of the digital video camera 100 and the state of installation after the changes are mainly detected in order to understand the influence that bluffing of the digital video camera 100 has on image quality of a captured image. However, factors that can influence the image quality of a captured image are not limited to this. For example, the image quality of the captured image can be influenced also by a change in the image capturing angle of view, a change in the spatial resolution of the subject in the captured image produced accompanying the change in the image capturing angle of view, or the entrance of a shielding material in the image capturing angle of view. Therefore, the detection unit 106 may be configured to detect phenomena that can influence image quality.

A determination unit 107 determines whether or not a predetermined image quality is ensured in the viewpoint image generated by compositing captured images obtained by the digital video cameras 100. As mentioned above, the image capture system of the present embodiment generates the viewpoint image by compositing captured images obtained by at least some of the digital video cameras 100, for each predetermined viewpoint. For this reason, there is a possibility that a predetermined image quality will not be ensured in the generated viewpoint image, due to image quality degradation that occurs in the captured images. As mentioned later, depending on the state of installation of the plurality of digital video cameras 100, it is possible that there will not be enough images for the compositing of a generated viewpoint image, or there will be no captured image that includes an image of the subject in the image capturing angle of view of the viewpoint image, and thus there is a possibility that a predetermined image quality will not be ensured.

Accordingly, the determination unit 107 of each digital video camera 100 obtains information about the other digital video cameras 100 that capture the viewpoint images that are used for compositing in order to determine whether or not image quality is ensured in various viewpoint images that are generated by compositing the obtained captured images. In the present embodiment, environmental information that describes the installation environment of the digital video cameras 100 is obtained for use in the determination, and includes about the installation position and image capturing direction, and information about the presence of phenomena (influential factors) that can influence the image quality, all of which are detected by the detection units 106 of the digital video cameras 100. The environmental information is individually held in all of the plurality of digital video cameras 100*a* to 100*z*, is updated when changes in the state of installation are detected by the detection unit 106, and is shared with the other digital video cameras 100 as needed. In order to be shared, the environmental information may include identification information (camera ID) of the digital video cameras 100 such that is it possible to identify which of the digital video cameras 100 the information originated from.

Note that in the present embodiment, the previously mentioned information is included in the environmental information, but the present invention is not limited to this. For example, information about the installation position and the image capture direction of the digital video cameras 100 may be included only if changes occur in a mode in which the information is shared between the cameras. Also, if the digital video cameras 100 are configured to capture a fixed subject in the image capturing angle of view, the image capture direction information need not be included. The information about the installation position and the image capture direction may be converted into information about the density and number of cameras capturing the same subject, and the resulting information may be included in order for the determination unit 107 to perform determination with consideration given to the installation density and the number of digital video cameras 100 installed in a predetermined geographic region, although this will be described in more detail later. For example, it is also possible to use a configuration in which information about whether or not phenomena that can influence the image quality of a captured image have been detected is used to calculate the degree of image quality degradation as an image quality value, which is obtained by scoring the image quality of the captured images captured by the digital video cameras 100 based on predetermined evaluation items.

Also, the environmental information in the present embodiment is based on actual measurements, such as detection mainly by the detection unit 106, but the present invention is not limited to this. Phenomena that can influence the image quality of a viewpoint image, which can occur dynamically, are preferably detected based on actual measurements, but the information about the installation position, the information about the image capture direction, and the like, which are essentially fixed, may be information input by a user. Also, the present invention may be configured such that phenomena that can influence the image quality of the viewpoint image and the content of changes to the state of installation, can be kept track of and input by the user.

An evaluation unit 108 derives an evaluation value for the generated viewpoint image for each viewpoint, based on the determination results of the determination unit 107. Here, the evaluation value is a value for evaluating the image quality of the viewpoint image that is generated for the viewpoint, with the spatial resolution, the rate of usage (or the rate of defective pixels that cannot be artificially generated) of pixels (texture) artificially generated through interpolation, the presence of color irregularity in a specified subject, or the like, being used as a reference. The reference for the image quality evaluation of the viewpoint image is not limited to this, but at the very least, it is possible to use a configuration in which it is possible to identify that the evaluation values indicate whether or not image quality degradation can occur in the viewpoint image generated for the viewpoint.

A communication unit 109 is a communication interface of the digital video camera 100 and performs the transmission and reception of information between the digital video cameras 100 and with the distribution server 200 of the present embodiment. Note that when transmitting information to an external apparatus, processing such as encoding or conversion to a predetermined file format may be performed. The digital video cameras 100 of the present embodiment output the evaluation value for each viewpoint derived by the evaluation units 108 to the distribution server 200 via the communication units 109.

Note that in the present embodiment, for the sake of simplicity, each of the plurality of digital video cameras 100a to 100z obtains environmental information, determines whether or not a predetermined image quality is ensured in the viewpoint image using the captured images, and derives and outputs the evaluation value for each of the viewpoints. Specifically, each of the digital video cameras 100 that obtain the captured images to be used in the generation of the viewpoint image of a viewpoint can derive evaluation values for the same viewpoint, but the present invention is not limited to this. It is sufficient that any one of the digital video cameras 100 derives the evaluation values for each viewpoint, and it is also possible to determine in advance which viewpoint the digital video camera 100 will derive the evaluation values for.

In the present embodiment, processing is realized by a circuit or a processor corresponding to the blocks included in the digital video camera 100 as hardware. However, the present invention is not limited to this, and the processing of the blocks may be realized by a program that performs processing similar to that of the blocks.

Configuration of the Distribution Server 200

Next, the functional configuration of the distribution server 200 will be described. Note that the distribution server 200 of the present embodiment is configured such that it is capable of compositing processing using images of a frame received from the digital video cameras 100 such that a moving image at an arbitrary viewpoint can be provided based on a request from an external apparatus or the like. However, the distribution server 200 of the present invention need not have such a functional configuration, and the distribution server 200 may be an apparatus that performs operational control of the plurality of digital video cameras 100 in order to record data for a moving image at an arbitrary viewpoint, for example.

A control unit 201 controls the operation of each block of the distribution server 200. Specifically, the control unit 201 reads out the operation program of the blocks recorded in the storage medium 202 for example, and controls the operation of the blocks by deploying the program to a memory 203 and executing it.

The storage medium 202 is a non-volatile storage apparatus, and performs permanent data storage. The storage medium 202 records information such as parameters needed for the operation of the blocks, as well as the operation program of the blocks of the distribution server 200. Also, the memory 203 is a volatile recording apparatus, and is used not only as a deployment region for the operation program of the blocks, but also as a storage region for temporarily storing intermediate data that is output due to the operation of the blocks.

An image processing unit 204 uses the images received from the plurality of connected digital video cameras 100, and performs compositing processing for generating a viewpoint image for each of a predetermined plurality of types of viewpoints. Compositing processing may include generation of a three-dimensional model based on a plurality of viewpoints, rendering processing using the three-dimensional model in order to generate an arbitrary viewpoint image, and the like. For the sake of simplicity, the plurality of digital video cameras 100 are controlled such that they synchronously perform the image capturing operation for each frame, and images obtained from each frame of the same time are used for the generation of the viewpoint image of an arbitrary viewpoint of one frame.

An image accumulation unit 205 stores the captured images obtained by the plurality of digital video cameras 100 and the viewpoint image of the predetermined viewpoint that was generated by the image processing unit 204. In the present embodiment, if the distribution server 200 performs moving image distribution, the corresponding images of the viewpoint images and the captured images accumulated in the image accumulation unit 205 are read out and distributed in frame order (in order of image capture time) in response to selection of a viewpoint. In the present embodiment, captured images and viewpoint images are accumulated and managed in the image accumulation unit 205 of the distribution server 200, but it is easily understood that the present invention is not limited to this. Specifically, the accumulation of images may be performed by a device different from the distribution server 200 that performs distribution, and may be performed in part by the digital video camera 100.

A display unit 206 is, for example, a display apparatus such as an LCD, and is detachably connected to the distribution server 200. The image capture system of the present embodiment is configured such that it is possible to perform the selection of a viewpoint at which a distributor is to perform distribution when distributing moving images to the end user terminal. The display unit 206 displays a notification of the state of the viewpoint images for the viewpoints based on the evaluation values, such that the distributor can understand which viewpoint among the predetermined viewpoints it is preferable to perform distribution of the viewpoint image from. In particular, if it is possible to provide a viewpoint image of an arbitrary viewpoint, the number of selectable viewpoint images may accordingly increase, and as a result, it is difficult for the distributor to check all of the viewpoint images, and it is also difficult to understand the details of the image quality of the viewpoint images even when displayed in a list such that they can be compared. Also, in order to display a large number of viewpoint images on the display unit 206 simultaneously, display control for reading out the viewpoint images accumulated in the image accumulation unit 205 and performing screen configuration is needed, which is suitable in terms of memory access. Accordingly, the distribution server 200 of the present embodiment facilitates moving image distribution at a desired image quality by displaying not the viewpoint images, but a notification based on the evaluation values of the viewpoints on the display unit 206.

A viewpoint selection unit 207 selects the viewpoint to distribute when performing moving image distribution to the end user terminal in the image capture system. In the present embodiment, the viewpoint is selected according to predetermined operation input due to the distributor performing the operation input in the distribution server 200, but the present invention is not limited to this. Specifically, viewpoint selection may be performed under predetermined rules based on the evaluation value, and does not require operation input to be performed.

Based on the viewpoint selected by the viewpoint selection unit 207, a distribution unit 208 reads out the corresponding viewpoint images from the image accumulation unit 205 in chronological order, encodes them as frames of a distribution moving image and distributes the resulting frames via a server communication unit 209. The distributed encoded moving image can be viewed by being decoded in the end user terminal.

The server communication unit 209 is a communication interface of the distribution server 200, and performs the transmission and reception of information between the plurality of connected digital video cameras 100, and with the end user terminal, in the present embodiment. Note that processing such as encoding and conversion to a predetermined data format may be performed when information is transferred to the digital video cameras 100.

Evaluation Value Output Processing

Evaluation value output processing performed by the digital video cameras 100 of the image capture system of the present embodiment having such a configuration will be described with reference to flowchart of FIG. 2. The processing corresponding to the flowchart is realized by the system controller 101 reading out a corresponding processing program stored in an internal memory for example, deploying the program to the RAM, and executing the program. The present evaluation value output processing is started when captured images of one frame are obtained in the digital video cameras 100, for example, and is repeated for each frame.

In step S201, the system controller 101 judges whether or not a change in the state of installation of the digital video camera 100 (itself) has been detected by the detection unit 106. If the system controller 101 judges that a change in the state of installation has been detected, the processing moves to step S202, and after environmental information of the digital video camera 100 is updated based on the changed state of installation, the processing moves to step S203. Also, if the system controller 101 judges that no change in the state of installation has been detected, processing moves to step S203.

In step S203, the system controller 101 obtains environmental information via the communication unit 109 from the digital video cameras 100 whose captured images are to be used in the generation of the viewpoint image for the viewpoint that has been allocated so that the evaluation value is derived by the digital video cameras 100. Here, the digital video cameras 100 whose captured images are to be used to generate a viewpoint image of a specific viewpoint need not be all of the digital video cameras 100, and thus the environmental information may be obtained from at least some of the digital video cameras 100. Specifically, in the viewpoint image that is generated for the predetermined viewpoint, captured images including surfaces and the like that do not appear in the image due to being shielded by a specified subject are not used for compositing, and therefore the digital video cameras 100 that obtain the environmental information in the present step may be limited. Also, the viewpoints for which the evaluation values are derived in the digital video cameras 100 that execute the present evaluation value output processing are viewpoints that are to be used in the compositing of the captured images of the digital video cameras 100, and derivation is not performed for any other viewpoints. Specifically, the viewpoints for which the evaluation values are derived are the viewpoints that use the captured images of at least some of the digital video cameras 100 in the generation of the viewpoint image. Note that when obtaining environmental information, information exchange may be performed in which a digital video camera 100 that is to obtain information transmits its own environmental information to itself.

In step S204, the system controller 101 selects a viewpoint for which an evaluation value has not yet been derived, among the viewpoints to which evaluation value derivation has been allocated. In the evaluation value output processing of the present embodiment, the processing of steps S204 to S207 is performed for each viewpoint to which evaluation value derivation is allocated, and evaluation values to be displayed in the distribution server 200 are derived.

In step S205, the determination unit 107 references the environmental information obtained from the group of digital video cameras 100 that captured the captured images to be used in the determination of the viewpoint image of the selected viewpoint (target viewpoint), and determines whether or not a predetermined image quality is ensured in the viewpoint image. In the evaluation value output processing of the present embodiment, determination of the image quality of the viewpoint image is performed based on the installation positions of the group of digital video cameras 100 that captured the captured images to be used for compositing.

Specifically, the determination unit 107 derives the installation density of the digital video cameras 100 that are installed in the geographic range corresponding to the target viewpoint, based on information about the installation positions of the environmental information of the digital video cameras 100, which includes the environmental information of the digital video camera 100 of the determination unit 107. Here, the geographic range that corresponds to the target viewpoint may be set based on the direction or image capturing angle of view for which image capture is preferable at the time of generating the viewpoint image of the target viewpoint, for example. Also, the digital video camera 100 that obtains environmental information to be used for determination is included in the geographic range. The determination unit 107 references the information about the installation position of the environmental information, specifies the number of digital video cameras 100 installed in the geographical range corresponding to the viewpoint, and derives the number of installed digital video cameras 100 per unit area as the installation density.

In step S206, the evaluation unit 108 derives the evaluation value for to the image quality of the viewpoint image, based on the determination result of the determination unit 107 and information about whether or not an influential factor for the environmental information obtained from the group of digital video cameras 100 whose captured images are to be used in the generation of the viewpoint image for the target viewpoint has been detected. Examples of an influential factor include vibration applied to the image capturing apparatus, shielding material in the angle of view; or the incidence state of ambient light. Evaluation value derivation may be performed by calculating a score according to the presence of an influential factor for each of the digital video cameras 100 used in the generation of the viewpoint image for example, and by further multiplying a coefficient obtained based on the determination result in step S205 by the sum total. In a mode in which a lower value indicates that image quality is less ensured, the score corresponding to whether or not of an influential factor was detected may be +1 if no influential factor was detected in the digital video camera 100 for example, or 0 if an influential factor was detected. In this case, the coefficient multiplied by the sum total score is a value that is proportional to the reciprocal of the installation density.

Here, differences in the installation density of the digital video cameras 100 used in the generation of each viewpoint image occur due to structural problems of the building in which the plurality of image capturing apparatuses are set, the conditions of the site in which the plurality of image capturing apparatuses are set, or the like. For this reason, if a method of simply adding the evaluation value obtained from each of the digital video cameras 100 used in the generation of viewpoint images is used, there will be differences in the evaluation values of the viewpoint image according to the installation density in a state with no influential factor. In this case, there is a risk that the selection range of viewpoint images by the end user will be substantially narrowed and the advantage of being able to view a subject while freely moving the viewpoint will not be utilized to the maximum limit.

In view of this, the evaluation unit 108 corrects the evaluation value obtained based on the influential factor according to the installation density of the group of digital video cameras 100. In other words, the evaluation unit 108 corrects the coefficient corresponding to the reciprocal of the installation density by multiplying it by the evaluation value obtained based on the influential factor in step S206, and stores the corrected evaluation value in the memory in association with an identifier of the target viewpoint. Thus, in a standard environment, regardless of the installation density, uniform evaluation values are derived for any of the viewpoint images.

In step S207, the system controller 101 judges whether or not the evaluation values have been derived for all of the viewpoints to which evaluation value derivation has been allocated. If the system controller 101 judges that evaluation values for all of the viewpoints to which evaluation value derivation is allocated have been derived, the processing moves to step S208, and if the system controller 101 judges that the evaluation values have not been derived, the processing moves to step S204.

In step S208, the system controller 101 outputs the derived evaluation values of all viewpoints to the distribution server 200 via the communication unit 109, and the present evaluation value output processing ends. The evaluation values that were output to the distribution server 200 need only be displayed as indices for viewpoint selection on the display unit 206 of the distribution server 200.

Thus, according to the image capture system of the present embodiment, it is possible to present the distributor with evaluation values that indicate whether or not image quality degradation can occur at each viewpoint, based on the states of the image capturing apparatuses that are installed in the image capturing environment. Also, by presenting the evaluation values for the image quality of each viewpoint, which were derived based on the state of the installation environment or the image capturing apparatuses, the distributor can perform control such that a viewpoint image with a desired image quality is distributed to the end user terminal.

Variation 1

In the above-mentioned Embodiment 1, the digital video cameras 100 were described as being installed in set image capture directions in order to capture images of a specific subject, but the present invention are not limited to this. That is, the present invention can be applied also in a mode in which the image capture directions are set such that the plurality of digital video cameras 100 capture images of a variety of subjects and the group of digital video cameras 100 installed in a geographic range corresponding to the viewpoint are not set such that they all capture images of the same subject.

Embodiment 2

In the above-described Embodiment 1 and Variation 1, essentially, in regards to the viewpoint image of the target viewpoint, movement and vibration that occurs in the digital video cameras 100 whose captured images are to be used to generate the viewpoint image are detected as phenomena that can influence image quality, and evaluation value derivation is performed. Also, during evaluation value derivation, the digital video cameras 100 that can provide the captured images for generating the viewpoint image of the target viewpoint use determination results obtained by determining whether or not a predetermined image quality is ensured for each viewpoint image, according to the states of installation of the digital video cameras 100.

Incidentally, even if the digital video cameras 100 are fixed in place, and movement, vibration, or the like does not occur, it is possible to capture captured images that will cause image quality degradation in a generated viewpoint image, depending on the subject. For example, due to the incidence state of ambient light in the image capturing angle of view changing according to the passage of time, there are cases where the captured images become like a back-lit scene, which is not suitable for compositing at the time of synthesizing a viewpoint image. In other words, the influence that changes in the incidence state of the ambient light have on the captured images does not occur in the same manner in the plurality of digital video cameras 100 installed at different positions, and as a result, differences in color information of a common subject in captured images can occur between the digital video cameras 100. Therefore, if these captured images are used to generate a viewpoint image, if the subject is the same, for example, there are cases where color continuity between successive pixels is not ensured due to the referenced captured images being different or the like and a suitable viewpoint image is not taken.

Also, the influence of the incidence state of ambient light can differ depending on the image capture direction, the image capturing angle of view, or the like, even if the digital video cameras 100 are installed at the same position or in proximity to each other. Also, changes in the incidence state of ambient light occur depending on the time and differences in color information between the captured images of the plurality of digital video cameras 100 can occur, but it is conceivable that this will not occur depending on weather conditions, for example. Alternatively, the incidence state of ambient light can change depending on the existence of a shielding material.

Accordingly, the present embodiment describes a mode of determining the influence that image quality degradation has on the viewpoint image, the image quality degradation occurring in the captured images due to indirect external factors such as the incidence state of external light, and not due to external factors that directly affect the digital video cameras 100, such as movement and vibration. Note that the image capture system, the digital video cameras 100, and the distribution server 200 of the present embodiment are the same as those of Embodiment 1, and their descriptions are omitted.

Evaluation Value Output Processing

The following is a detailed description of the evaluation value output processing of the present embodiment with reference to the flowchart of FIG. 3. Note that in the description of the present evaluation value output processing, steps that are the same as those in Embodiment 1 are denoted by the same reference numerals thereas, description thereof is omitted, and only operational steps for performing processes unique to the present embodiment are described below.

In step S301, the system controller 101 judges whether or not the image capture environment of the system controller 101 (the digital video camera 100) corresponds to a back-lit scene. The image capture environment does not necessarily correspond to a back-lit scene in all of the plurality of digital video cameras 100 installed in the image capturing environment, and occurs in a case where a subject and ambient light source have a specific positional relationship. Therefore, in the present step, the system controllers 101 of the digital video cameras 100 judge whether or not the image capture environment corresponds to a back-lit scene. It is possible to judge whether or not the image capture environment corresponds to a back-lit scene by using the following information, for example.

For example, in a state in which there exists a moving ambient light source such as the sun, it is possible to judge whether or not backlighting will occur at the current time based on data obtained by measuring in advance whether or not backlighting will occur at each time. Alternatively, in a configuration in which it is possible to specify the position of an ambient light source based on the current time, it is possible to judge whether or not backlighting will occur based on whether or not the ambient light source is included in the image capturing angle of view specified by the installation position and image capture direction of the digital video cameras 100. Here, in a case in which the target is a natural light source such as the sun, whether or not back-lighting will be caused by the light source depends on the weather conditions. That is, even with digital video cameras 100 that perform image capture in corresponding directions, the amount of ambient light that is incident from the light source in the image capturing angle of view decreases in rainy or cloudy weather, and therefore the image capturing environment does not correspond to a back-lit scene.

Also, it is possible to judge whether or not backlighting will occur by converting a captured image obtained by the image capture unit 103, for example, into luminance information, and analyzing a luminance distribution of the captured image, in which the luminance of the background region is higher than the luminance of the main subject region, for example.

If the system controller 101 judges that the image capture environment of the digital video camera 100 corresponds to a back-lit scene, the processing moves to step S302, the system controller 101 updates the environmental information such that it includes information showing that the image capture environment corresponds to a back-lit scene, and thereafter the processing moves to step S201. Also, if the system controller 101 judges that the image capturing environment of the digital video camera 100 corresponds to a back-lit scene, the processing moves to step S201. At this time, if information indicating that the image capture environment corresponds to a back-lit scene is included in the environmental information, this step may be deleted.

Note that in the present embodiment, the fact that image quality degradation of the viewpoint image may occur through use of the captured images is conveyed by including information indicating that the image capture environment corresponds to a back-lit scene in the environmental information, in the digital video cameras 100. However, the present invention is not limited to this. That is, the digital video cameras 100 may, in advance, include the information used in the judgment of whether or not the image capturing environment corresponds to a back-lit scene, such as that described above, and the determination of the determination unit 107 may be performed based on the installation position and image capture direction of the target digital video camera 100, for example. More specifically, information indicating the incidence state of ambient light in the image capturing angle of view, at a predetermined position or digital video camera 100, may be stored in advance in the memory, and the image capture rime and weather information may also be obtained as environmental information when performing determination. In other words, the acquisition source of the environmental information is not limited to other digital video cameras 100, and the environmental information may be obtained from an internal storage apparatus of the digital video camera 100, a weather server, or the like, in order to keep track of phenomena that can occur in the installation environment.

If a target viewpoint is selected in step S204, in step S303, the determination unit 107 references environmental information obtained from the group of digital video cameras 100 that captured the captured images to be used in the generation of the viewpoint image of the target viewpoint in step S303, and determines whether or not a predetermined image quality is ensured at the viewpoint. In the present embodiment, the determination unit 107 determines whether or not a captured image in which a back-lit scene is captured is included in the captured images to be used in the generation of the viewpoint image of the target viewpoint, and also determines the installation density of the previously-described Embodiment 1.

In step S304, the evaluation unit 108 derives an evaluation value for the image quality of the viewpoint image, based on the determination result of the determination unit 107, and the information regarding whether or not influential factors in the environmental information obtained from the group of digital video cameras 100 whose captured images are to be used to generate the viewpoint image of the target viewpoint have been detected. In the derivation of the evaluation value of the present embodiment, if it is determined that there is a captured image in which a back-lit scene is captured, a coefficient may be determined by further multiplying a coefficient determined based on the determination of installation density by 0.5. Here, if a captured image corresponding to a back-lit scene is used in the generation of a viewpoint image, there is a higher likelihood that image quality degradation will occur in the viewpoint image, and therefore an adjustment value for the coefficient obtained based on the back-lit scene may be determined such that the captured image corresponding to a back-lit scene can be explicitly separated. The evaluation unit 108 uses the coefficient determined in this way to derive the evaluation value for the target viewpoint, and thereafter stores the derived evaluation value in the memory in association with the identifier of the target viewpoint.

Thus, the image capture system of the present embodiment further determines the influence that image quality degradation has on the viewpoint image, the image quality degradation occurring in captured images due to indirect external factors, and the image capture system makes it possible for the distributor to select a more suitable viewpoint image.

Note that in the present embodiment, it is determined whether or not the image capturing environment corresponds to a back-lit scene, or information indicating whether or not the image capturing environment corresponds to a back-lit scene is included in the environment information, but factors that cause lowered image quality of the viewpoint image are not limited to backlighting. Specifically, factors that cause lowered image quality of the viewpoint image may be the occurrence of differences in color information of a common subject between captured images used for generation of a viewpoint image, and the environmental information may include color change information for determining whether or not change has occurred in the color information of the common subject. Because differences in color information between captured images can occur due to changes in image capture settings, changes to applied filters, or the like, of the digital video cameras 100 for example, the environmental information may include information indicating that a change that is a factor has occurred in the digital video cameras 100 as the color change information.

Second Variation

In the above described embodiments and variations, transmission and reception of environmental information is performed between the digital video cameras 100, and the digital video cameras 100 perform determination and derivation of evaluation values for predetermined viewpoints based on a plurality of pieces of environmental information. However, the present invention is not limited to this, and for example, an external information processing apparatus of the digital video cameras 100, which may be the distribution server 200 for example, may collect environmental information for the predetermined viewpoints and may perform determination and derive the evaluation value. Also, the distribution server 200 may be configured to receive only the determination results, derive the evaluation value, and perform notification for selecting the viewpoint images based on the evaluation value, in other words, the present invention is not limited to a mode in which the digital video cameras 100 obtain environmental information from other digital video cameras 100 and perform determination and output of evaluation values. Also, the determination and the output of the evaluation values may be performed in the distribution server 200 that collects and stores captured images, and may be performed in conjunction with an arbitrary device of the image capture system.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-204586, filed Oct. 23, 2017, which is hereby incorporated by reference herein in its entirety.

What is claimed is:

1. An information processing apparatus for generating a viewpoint image of each of a plurality of predetermined viewpoints by compositing captured images captured at a plurality of different viewpoints, comprising:
at least one processor; and
a memory including instructions that, when executed by the at least one processor, cause the at least one processor to:
obtain information on a state of installation of a plurality of image capturing apparatuses that output captured images, wherein, for each of the plurality of predetermined viewpoints, a group of image capturing apparatuses, that output a plurality of captured images to be used to generate a viewpoint image of the predetermined viewpoint, is determined in advance;
determine image quality of the viewpoint image to be generated for each of the plurality of predetermined viewpoints, based on the information on the state of installation of the image capturing apparatuses; and
generate information for notifying the determination result of the image quality of the viewpoint image to be generated for each of the plurality of predetermined viewpoints.

2. The information processing apparatus according to claim 1, wherein the information on the state of installation is the number of the group of image capturing apparatuses that output the captured images to be used to generate the viewpoint image for each of the plurality of predetermined viewpoints.

3. The information processing apparatus according to claim 1, wherein the information on the state of installation is an installation density of the group of image capturing apparatuses that output the captured images to be used to generate the viewpoint image for each of the plurality of predetermined viewpoints.

4. The information processing apparatus according to 1, wherein the image quality of the viewpoint image to be generated for each of the plurality of predetermined viewpoints is determined based on at least one of vibration applied to each image capturing apparatus of the group of image capturing apparatuses corresponding to the predetermined viewpoint, a shielding material entering an angle of view, or an incidence state of ambient light.

5. The information processing apparatus according to claim 4, wherein in a case of corresponding to a back-lit scene, the image quality of the viewpoint image to be generated for each of the plurality of predetermined viewpoints is determined lower compared to a case of not corresponding to a back-lit scene.

6. The information processing apparatus according to claim 4, wherein the image quality of the viewpoint image to be generated for each of the plurality of predetermined viewpoints is determined based on at least one of information indicating the incidence state of ambient light in an image capturing angle of view at each time, an image capture time, and weather information, of each image capturing apparatus of the group of image capturing apparatuses corresponding to the predetermined viewpoint.

7. An image capture system for generating viewpoint image of each of a plurality of predetermined viewpoints by compositing captured images captured at a plurality of different viewpoints, comprising:
   a plurality of image capturing apparatuses configured to capture images at a plurality of different viewpoints;
   at least one processor; and
   a memory including instructions that, when executed by the at least one processor, cause the at least one processor to:
   obtain information on a state of installation of some of the image capturing apparatuses that output captured images, wherein, for each of the plurality of predetermined viewpoints, a group of image capturing apparatuses, that output a plurality of captured images to be used to generate a viewpoint image of the predetermined viewpoint, is determined in advance;
   determine image quality of the viewpoint image to be generated for each of the plurality of predetermined viewpoints, based on the information on the state of installation of the image capturing apparatuses; and
   generate information for notifying the determination result of the image quality of the viewpoint image to be generated for each of the plurality of predetermined viewpoints.

8. A control method for an information processing apparatus for generating a viewpoint image of each of a plurality of predetermined viewpoints by compositing captured images captured at a plurality of different viewpoints, comprising:
   obtaining information on a state of installation of a plurality of image capturing apparatuses that output captured images, wherein, for each of the plurality of predetermined viewpoints, a group of image capturing apparatuses, that output a plurality of captured images to be used to generate a viewpoint image of the predetermined viewpoint, is determined in advance;
   determining image quality of the viewpoint image to be generated for each of the plurality of predetermined viewpoints, based on the information on the state of installation of the image capturing apparatuses; and
   generating information for notifying the determination result of the image quality of the viewpoint image to be generated for each of the plurality of predetermined viewpoints.

9. A non-transitory computer-readable storage medium storing a program to be used by an information processing apparatus for generating a viewpoint image of each of a plurality of predetermined viewpoints by compositing captured images captured at a plurality of different viewpoints, the program being configured to cause a computer of the information processing apparatus to execute:
   obtaining information on a state of installation of a plurality of image capturing apparatuses that output captured images, wherein, for each of the plurality of predetermined viewpoints, a group of image capturing apparatuses, that output a plurality of captured images to be used to generate a first viewpoint image of the predetermined viewpoint, is determined in advance,
   determining image quality of the viewpoint image to be generated for each of the plurality of predetermined viewpoints based on the information on the state of installation of the image capturing apparatuses; and
   generating information for notifying the determination result of the image quality of the viewpoint image to be generated for each of the plurality of predetermined viewpoints.

\* \* \* \* \*